United States Patent
Otake et al.

(10) Patent No.: US 11,245,850 B2
(45) Date of Patent: Feb. 8, 2022

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Ritsuko Otake, Tokyo (JP); Takashi Adachi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/598,044

(22) Filed: Oct. 10, 2019

(65) Prior Publication Data
US 2020/0128185 A1    Apr. 23, 2020

(30) Foreign Application Priority Data

Oct. 18, 2018  (JP) .............................. JP2018-196885

(51) Int. Cl.
H04N 5/232 (2006.01)
G06T 17/30 (2006.01)
G06T 15/50 (2011.01)

(52) U.S. Cl.
CPC ......... *H04N 5/23293* (2013.01); *G06T 17/30* (2013.01); *G06T 15/503* (2013.01)

(58) Field of Classification Search
CPC .. H04N 5/23293; H04N 7/18; H04N 5/23216; H04N 5/23225; G06T 17/30; G06T 15/503; G06T 11/20; G08B 13/19682
See application file for complete search history.

(56) References Cited

U.S. PATENT DOCUMENTS

| | | |
|---|---|---|
| 8,196,060 B2 | 6/2012 | Tatehata et al. |
| 8,259,368 B2 | 9/2012 | Otake |
| 9,904,865 B2 | 2/2018 | Kusumoto |
| 10,360,471 B2 | 7/2019 | Arakawa et al. |
| 2009/0083659 A1 | 3/2009 | Tatehata et al. |
| 2012/0154853 A1 | 6/2012 | Otake |
| 2014/0355828 A1 | 12/2014 | Kusumoto |
| 2018/0144206 A1 | 5/2018 | Kusumoto |
| 2018/0189557 A1* | 7/2018 | Tang ................. G06K 9/00362 |
| 2019/0066372 A1* | 2/2019 | Falk-Wallace .......... G06F 30/00 |

FOREIGN PATENT DOCUMENTS

| | | |
|---|---|---|
| CN | 101393509 A | 3/2009 |
| CN | 105608319 A | 5/2016 |
| CN | 107665275 A | 2/2018 |
| CN | 109726368 A | 5/2019 |
| JP | 2008-182456 A | 8/2008 |
| JP | 2014-236312 A | 12/2014 |
| JP | 6261190 B2 | 1/2018 |

OTHER PUBLICATIONS

EPO Machine Translation of JP2008182456A Description (Year: 2020).*

* cited by examiner

*Primary Examiner* — Timothy J Henn
(74) *Attorney, Agent, or Firm* — Venable LLP (57) ABSTRACT

A specifying unit specifies a longest side among sides of a polygonal region set on an image captured by an image capturing unit. A display control unit causes a display unit to display the image on which the polygonal region and information concerning the polygonal region are superimposed. The display control unit causes the display unit to display the information at a position based on the longest side specified by the specifying unit.

5 Claims, 9 Drawing Sheets

| Analysis1 | | | |
|---|---|---|---|
| Time | Area1 | Area2 | Area3 |
| 13:00 | 10 | 5 | 2 |
| 13:05 | 10 | 5 | 3 |
| 13:10 | 9 | 6 | 3 |
| 13:15 | 7 | 4 | 2 |
| 13:20 | 8 | 5 | 1 |
| : | : | : | : |

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium, and particularly to an image analysis technique.

Description of the Related Art

Conventionally, there is known a technique in which when analyzing a video captured by a network camera, information representing an analysis target region is superimposed and displayed on the video. For example, Japanese Patent Laid-Open No. 2008-182456 discloses a technique of displaying, on an image, a plurality of rectangles each representing a detection range of a moving object or a still object, and displaying the title of the detection range on the upper portion of each rectangle. Furthermore, Japanese Patent No. 6261190 discloses a technique of setting a detection region by a polygon and displaying it on a video.

When regions as video analysis targets are set by a plurality of polygons in one screen, identification information may be displayed together with each polygon representing each region. At this time, since the shapes of the regions are not uniform, if identification information is displayed at a fixed position for each region, the problem that the correspondence between the region and the identification information may not be recognized clearly may arise.

SUMMARY OF THE INVENTION

The present invention provides a technique for arranging, at a position where the visibility is better, information concerning a polygonal region set on a screen.

According to the first aspect of the present invention, there is provided an image processing apparatus comprising: a specifying unit configured to specify a longest side among sides of a polygonal region set on an image captured by an image capturing unit; and a display control unit configured to cause a display unit to display the image on which the polygonal region and information concerning the polygonal region are superimposed, wherein the display control unit causes the display unit to display the information at a position based on the longest side specified by the specifying unit.

According to the second aspect of the present invention, there is provided an image processing method comprising: specifying a longest side among sides of a polygonal region set on an image captured by an image capturing unit; and causing a display unit to display the image on which the polygonal region and information concerning the polygonal region are superimposed, wherein in the causing the display unit, the information is displayed at a position based on the specified longest side.

According to the third aspect of the present invention, there is provided a non-transitory computer-readable storage medium storing a computer program for causing a computer to function as: a specifying unit configured to specify a longest side among sides of a polygonal region set on an image captured by an image capturing unit; and a display control unit configured to cause a display unit to display the image on which the polygonal region and information concerning the polygonal region are superimposed, wherein the display control unit causes the display unit to display the information at a position based on the longest side specified by the specifying unit.

Further features of the present invention will become apparent from the following description of exemplary embodiments (with reference to the attached drawings).

DESCRIPTION OF THE EMBODIMENTS

The embodiments of the present invention will be described below with reference to the accompanying drawings. Note that the embodiments to be described below are examples of detailed implementation of the present invention or detailed examples of the arrangement described in the appended claims.

First Embodiment

Figure 1:
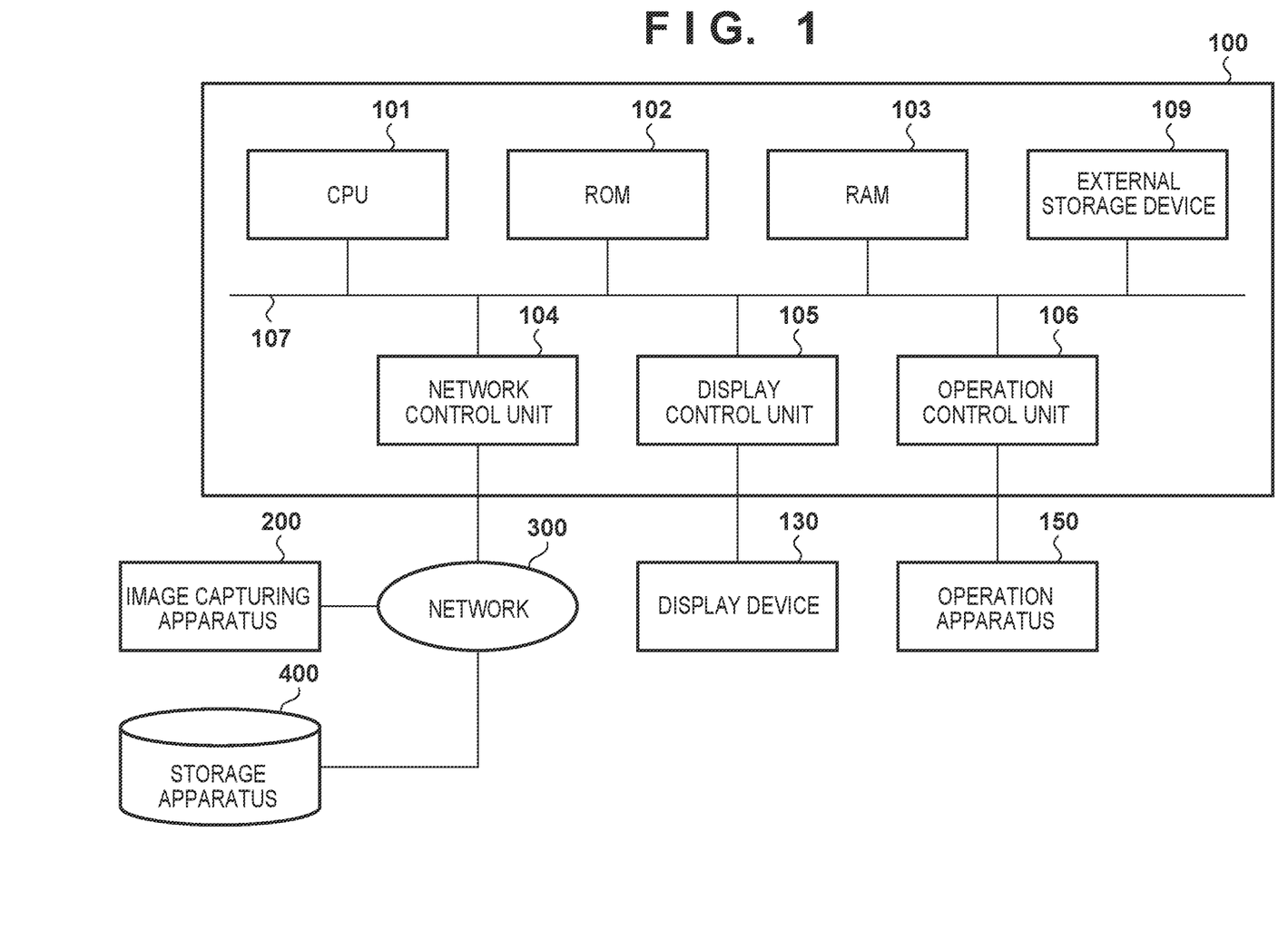
FIG. 1 is a block diagram showing an example of the hardware arrangement of a system.

An example of the hardware arrangement of a system according to this embodiment will be described with reference to a block diagram shown in FIG. 1. As shown in FIG. 1, the system according to this embodiment includes an image processing apparatus 100, a display device 130, an operation apparatus 150, an image capturing apparatus 200, and a storage apparatus 400. The image capturing apparatus 200 and the storage apparatus 400 are each connected to the image processing apparatus 100 via a wired and/or wireless network 300.

The image capturing apparatus 200 will first be explained. The image capturing apparatus 200 captures a moving image or a still image. The image capturing apparatus 200 transmits, when capturing a moving image, an image of each frame as a captured image to the image processing apparatus 100 via the network 300, and transmits, when capturing a still image, the still image as a captured image to the image processing apparatus 100 via the network 300.

The storage apparatus 400 will be described next. The storage apparatus 400 saves various images such as moving images and still images, and can supply the moving image or the still image to the image processing apparatus 100 via the network 300 in response to a request from the image processing apparatus 100.

The image processing apparatus 100 will be explained next. The image processing apparatus 100 is implemented by a computer apparatus such as a PC (Personal Computer), a tablet terminal apparatus, or a smartphone.

A CPU 101 executes various processes using computer programs and data stored in a ROM 102 and a RAM 103. This causes the CPU 101 to control the overall operation of the image processing apparatus 100 while executing or controlling each process to be described later as that executed by the image processing apparatus 100.

The ROM 102 stores the setting data and activation program of the image processing apparatus 100. The RAM 103 has an area to store computer programs and data loaded from the ROM 102 and an external storage device 109. Furthermore, the RAM 103 has an area to store data (the moving image, still image, or the like) received by a network control unit 104 from the image capturing apparatus 200 or the storage apparatus 400 via the network 300. The RAM 103 also has a work area used by the CPU 101 to execute various processes. As described above, the RAM 103 can appropriately provide various areas.

The external storage device 109 is a large-capacity information storage device such as a hard disk drive device. The external storage device 109 saves an OS (Operating System), and computer programs and data for causing the CPU 101 to execute or control each process to be described later as that executed by the image processing apparatus 100. The data saved in the external storage device 109 include various setting data (to be described later) and information processed as known information by the image processing apparatus 100 in the following description.

The computer programs and data saved in the external storage device 109 are appropriately loaded into the RAM 103 under the control of the CPU 101 and processed by the CPU 101.

The network control unit 104 controls data communication with the image capturing apparatus 200 or the storage apparatus 400 via the network 300. A display control unit 105 executes display control for displaying display information such as an image or characters on the display device 130. An operation control unit 106 notifies the CPU 101 of various instructions input by operating the operation apparatus 150 by the user.

The CPU 101, the ROM 102, the RAM 103, the external storage device 109, the network control unit 104, the display control unit 105, and the operation control unit 106 are all connected to a bus 107.

The display device 130 will be described next. The display device 130 is formed by a liquid crystal screen, a touch panel screen, or the like, and can display a processing result by the image processing apparatus 100 using an image, characters, or the like. The display device 130 may be a projection apparatus such as a projector that projects an image, characters, or the like.

The operation apparatus 150 will be explained next. The operation apparatus 150 is formed by a user interface such as a mouse, a keyboard, or a touch panel screen, and can be operated by the user to input various instructions to the image processing apparatus 100 (CPU 101).

Note that this embodiment employs the arrangement shown in FIG. 1. However, an arrangement applicable to the following description is not limited to that shown in FIG. 1 and various arrangements are applicable. For example, the image processing apparatus 100, the display device 130, the operation apparatus 150, the image capturing apparatus 200, and the storage apparatus 400 have been described as separate apparatuses in FIG. 1. However, two or more of these apparatuses may be integrated into one apparatus. For example, by incorporating the image processing apparatus 100 in the image capturing apparatus 200, the image capturing apparatus 200 may perform each process to be described later as that executed by the image processing apparatus 100. One or more of the display device 130, the operation apparatus 150, and the storage apparatus 400 may be integrated with the image processing apparatus 100.

Processing executed by the system having the above arrangement to decide (set) a position on a screen for displaying an image, where the label of each polygonal region (a region having a polygonal shape) set on the screen is arranged (displayed) will be described next. Note that an example of the label is identification information (ID) for uniquely identifying each polygonal region.

Figure 2A:
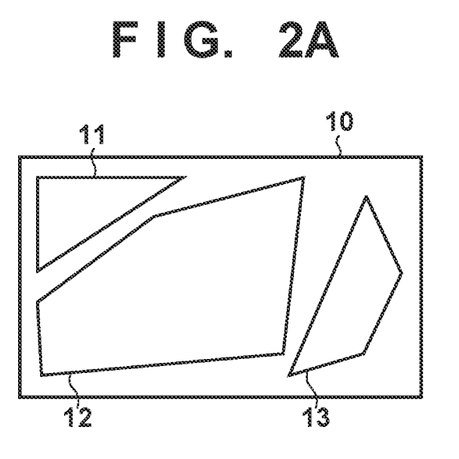
FIGS. 2A and 2B are views for explaining polygonal regions and labels.

FIG. 2A shows examples of polygonal regions set on a screen 10. The screen 10 may be the entire screen of the display device 130 or a partial screen provided to display an image.

Referring to FIG. 2A, on the screen 10, a polygonal region 11 as a triangular region, a polygonal region 12 as a pentagonal region, and a polygonal region 13 as a quadrangular region are set. Each of the polygonal regions 11, 12, and 13 on the screen 10 may be a region set on the screen 10 by operating the operation apparatus 150 by the user or a region of an object detected by the CPU 101 or the like from an image displayed on the screen 10. For example, each of the polygonal regions 11, 12, and 13 may be set as a predetermined region on the screen 10 to count the number of people included in the predetermined region.

Figure 2B:
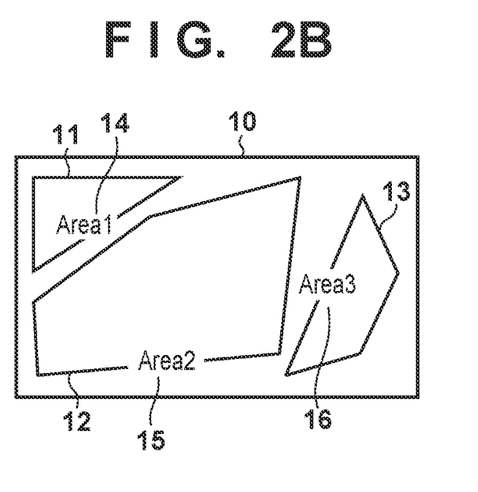

In this embodiment, as shown in FIG. 2B, a label 14 for the polygonal region 11, a label 15 for the polygonal region 12, and a label 16 for the polygonal region 13 are arranged on the screen 10. In FIG. 2B, a character string "Area 1" representing the name of the polygonal region 11, a character string "Area 2" representing the name of the polygonal region 12, and a character string "Area 3" representing the name of the polygonal region 13 are arranged as the labels 14, 15, and 16, respectively, on the screen 10. In this embodiment, each label is arranged at the middle point position of the longest side among the sides of the corresponding polygonal region. In fact, since the image is displayed on the screen 10, the labels 14, 15, and 16 are superimposed and displayed on the image.

Figure 3:
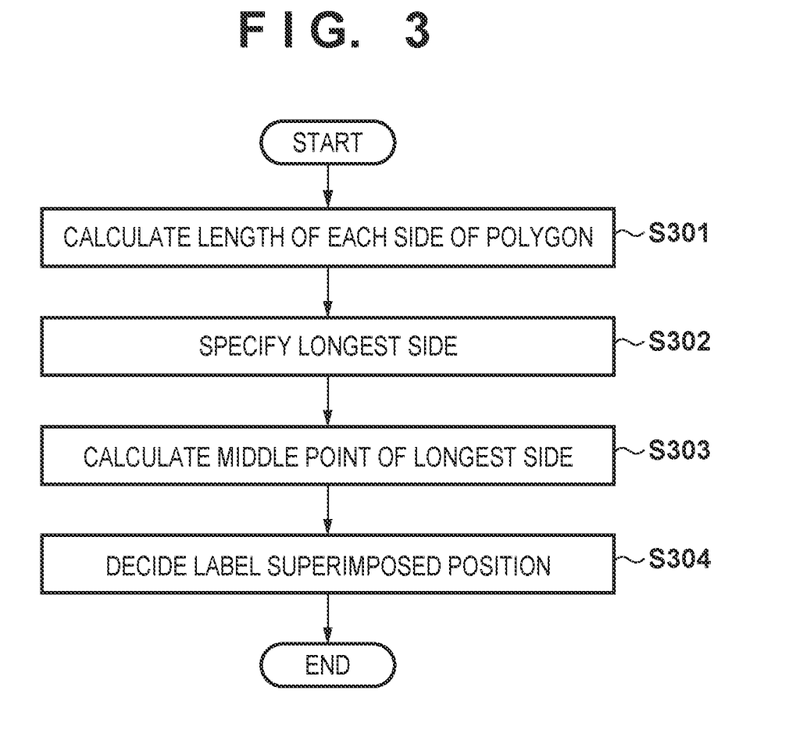
FIG. 3 is a flowchart illustrating processing of setting the arrangement position of the label of each polygonal region.

Processing of setting the arrangement position (label superimposed position) of the label of each polygonal region will be described with reference to a flowchart shown in FIG. 3. Note that the processing according to the flowchart shown in FIG. 3 is a flowchart of processing of setting the arrangement position of the label of one polygonal region. Therefore, if a plurality of polygonal regions are set on the screen, the arrangement position of the label of each of the plurality of polygonal regions is set by performing the processing according to the flowchart shown in FIG. 3 for each of the plurality of polygonal regions. In the following description, the "screen" may indicate the entire screen of the display device 130 or a partial screen provided to display an image.

In step S301, the CPU 101 obtains the length of each side of the polygonal region set on the screen. If the polygonal region 11 is targeted in FIG. 2A, the CPU 101 obtains the length of each of three sides forming the polygonal region 11. Note that the length of each side of the polygonal region set on the screen is obtained as, for example, the distance between a pixel position at one end of the side and that at the other end of the side. The pixel position is, for example, a position in a coordinate system in which a position at the upper left corner of the screen is set as an origin (0, 0), a position in the horizontal direction is set as an x-coordinate, and a position in the vertical direction is set as a y-coordinate.

In step S302, the CPU 101 specifies the longest side among the sides forming the polygonal region. In this specifying processing, the lengths obtained in step S301 for the sides forming the polygonal region are compared to each other, and the side for which the longest length has been obtained is specified as the longest side.

In step S303, the CPU 101 specifies the position of the middle point of the longest side specified in step S302. The position of the middle point of the longest side is obtained as, for example, the middle point position between a pixel position at one end of the longest side and that at the other end of the longest side.

In step S304, the CPU 101 sets, as the arrangement position (display position) of the label of the polygonal region, the middle point position obtained in step S303, and stores the arrangement position in the RAM 103 or the external storage device 109.

Note that after the processes in steps S301 to S304 are performed for each polygonal region set on the screen, the CPU 101 may cause the display device 130 to display the screen with the image displayed, on which the frame of each polygonal region and its label are superimposed. The label of each polygonal region is arranged at the arrangement position set for the polygonal region in the processing according to the flowchart shown in FIG. 3. Furthermore, the image displayed on the screen is, for example, an image (a still image or an image of each frame in a moving image) obtained from the image capturing apparatus 200 or the storage apparatus 400 or an image (a still image or an image of each frame in a moving image) saved in the external storage device 109.

<Application>

Figure 4A:
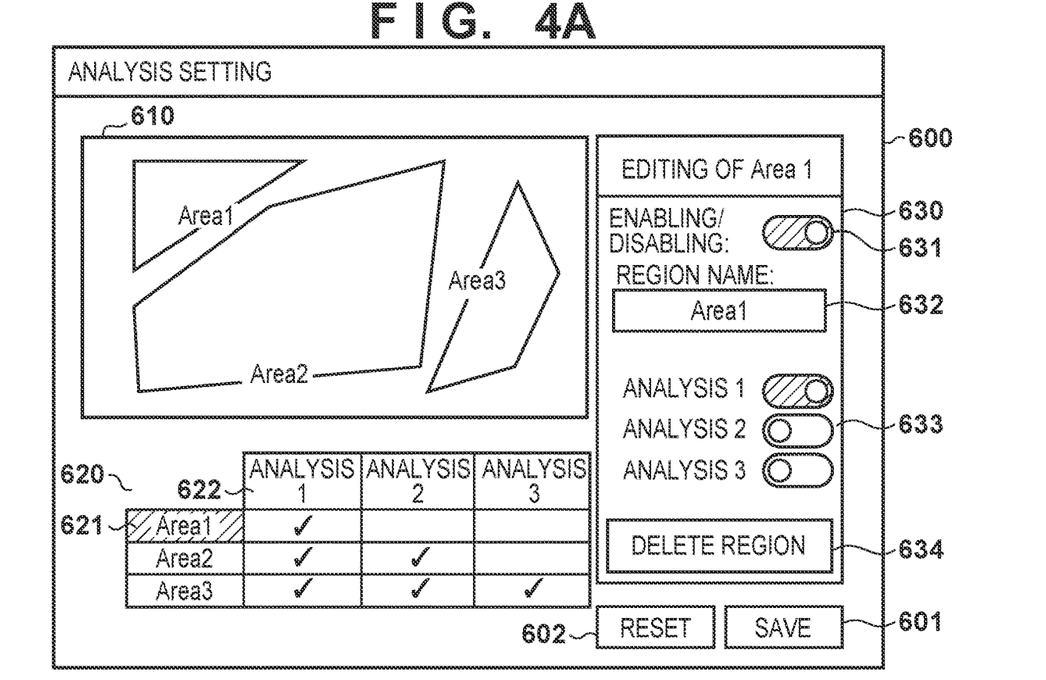
FIGS. 4A and 4B are views each showing an example of the arrangement of a GUI.

An application of this embodiment will be described below. In this application, a GUI (Graphical User Interface) 600 as an operation screen exemplified in FIG. 4A is displayed on the display screen of the display device 130. A user operation on the GUI 600 is input by operating the operation apparatus 150 by the user unless otherwise specified. In addition, assume that the CPU 101 or the display control unit 105 executes or controls the display control of the GUI 600 or processing according to a user operation on the GUI 600.

In a display region (corresponding to the above "screen") 610, a captured image received from the image capturing apparatus 200 immediately before the display of the GUI 600 is displayed, and the frame of a set polygonal region and its label are superimposed on the captured image. The label is arranged at the arrangement position set for the label in the processing according to the flowchart shown in FIG. 3. Note that the captured image displayed in the display region 610 is not limited to that acquired from the image capturing apparatus 200, and may be a captured image acquired from the storage apparatus 400 or the external storage device 109 (a captured image saved in the storage apparatus 400 or the external storage device 109). Alternatively, the captured image displayed in the display region 610 may be a captured image acquired from another apparatus.

Note that the user can add a polygonal region onto the captured image in the display region 610 by operating the operation apparatus 150. For example, if the user uses a mouse as the operation apparatus 150, he/she moves a mouse cursor into the display region 610 by operating the mouse. Then, every time the user performs a click operation in the display region 610 by operating the mouse, the position of the mouse cursor at which the click operation is performed is registered as a vertex position of a polygonal region in the RAM 103, the external storage device 109, or the like. The position of the mouse cursor at this time is, for example, a position in a coordinate system in which a position at the upper left corner of the display region 610 is set as an origin (0, 0), a position in the horizontal direction is set as an x-coordinate, and a position in the vertical direction is set as a y-coordinate. If the position of the mouse cursor at which the user clicks this time is a position within a predetermined range from the position of the mouse cursor at which the user clicks for the first time, the frame of the polygonal region obtained by connecting the registered vertex positions by line segments in the registration order is superimposed and displayed on the captured image. A label is newly issued for the thus added polygonal region. For example, if the polygonal region added this time is the Nth (N is an integer of 1 or more) polygonal region set in the display region 610, a label "Area N (N represents a generation ordinal number, and is a natural number of 1, 2, 3, . . . ) is issued for the polygonal region added this time. Then, the arrangement position of the label "Area N" is set in accordance with the flowchart shown FIG. 3, and the label "Area N" is superimposed and displayed at the set arrangement position. A row corresponding to the polygonal region added this time is added to a selection portion 620.

In each row of the selection portion 620, setting contents indicating which of analyses 1, 2, and 3 is to be executed for the corresponding polygonal region are displayed. In the case shown in FIG. 4A, setting contents for the polygonal region with the label "Area 1" are displayed in the first row, setting contents for the polygonal region with the label "Area 2" are displayed in the second row, and setting contents for the polygonal region with the label "Area 3" are displayed in the third row.

With respect to the polygonal region with the label "Area 1", a check mark is displayed for analysis 1 and no check mark is displayed for analyses 2 and 3. The setting contents for the polygonal region with the label "Area 1" indicate that "for the polygonal region with the label "Area 1", analysis 1 is executed and neither of analyses 2 and 3 is executed".

With respect to the polygonal region with the label "Area 2", a check mark is displayed for analyses 1 and 2 and no check mark is displayed for analysis 3. The setting contents for the polygonal region with the label "Area 2" indicate that "for the polygonal region with the label "Area 2", analyses 1 and 2 are executed and analysis 3 is not executed".

With respect to the polygonal region with the label "Area 3", a check mark is displayed for analyses 1, 2, and 3. The setting contents for the polygonal region with the label "Area 3" indicate that "for the polygonal region with the label "Area 3", analyses 1, 2, and 3 are executed".

In this case, the user can select a desired row among the rows in the selection portion 620 by operating the operation apparatus 150. In FIG. 4A, a button 621 (a button that displays the label "Area 1") corresponding to the first row is selected. At this time, a setting portion 630 used to set detailed settings of the polygonal region with the label "Area 1" is displayed on the right side in the GUI 600.

A switching button 631 is a button for switching enabling/disabling, for which "enabling" is usually set. If the user sets "disabling" by operating the switching button 631 using the operation apparatus 150, analysis for the polygonal region with the label "Area 1" stops while holding the detailed settings for the polygonal region in the RAM 103 or the external storage device 109. On the other hand, if "enabling" is set, the detailed settings for the polygonal region with the label "Area 1" are applied.

A region 632 is a region for editing the label "Area 1". If, for example, the user inputs a character string to the region 632 by operating the operation apparatus 150, the label "Area 1" can be changed to the input character string. The character type and the number of characters usable for the label may be limited.

Switching buttons 633 include buttons provided for analyses 1, 2, and 3, which are used to switch enabling/disabling of analyses 1, 2, and 3, respectively. In FIG. 4A, since enabling is set for analysis 1 and disabling is set for analyses 2 and 3, settings indicating "analysis 1 is executed and neither of analyses 2 and 3 is executed" are made for the polygonal region with the label "Area 1". These setting contents are reflected on the first row of the selection portion 620.

A delete button 634 is a button for instructing deletion of the polygonal region with the label "Area 1". If the user presses the delete button 634 by operating the operation apparatus 150, information (the positions of the vertices, detailed settings, and the like) concerning this polygonal region is deleted from the RAM 103 or the external storage device 109, and the frame and label of this polygonal region are erased from the display region 610.

A save button 601 is a button used to instruct the CPU 101 to save, in the external storage device 109, the setting contents set using the GUI 600. A reset button 602 is a button used to instruct the CPU 101 to return (reset) the setting contents set using the GUI 600 to those when the save button 601 is pressed last. Note that if the reset button 602 is pressed in the situation in which the save button 601 is never pressed after the display of the GUI 600, the setting contents are returned to default setting contents.

Note that the above saving processing and reset processing may be made executable for each polygonal region by also providing the save button 601 and the reset button 602 in the setting portion 630.

Figure 4B:
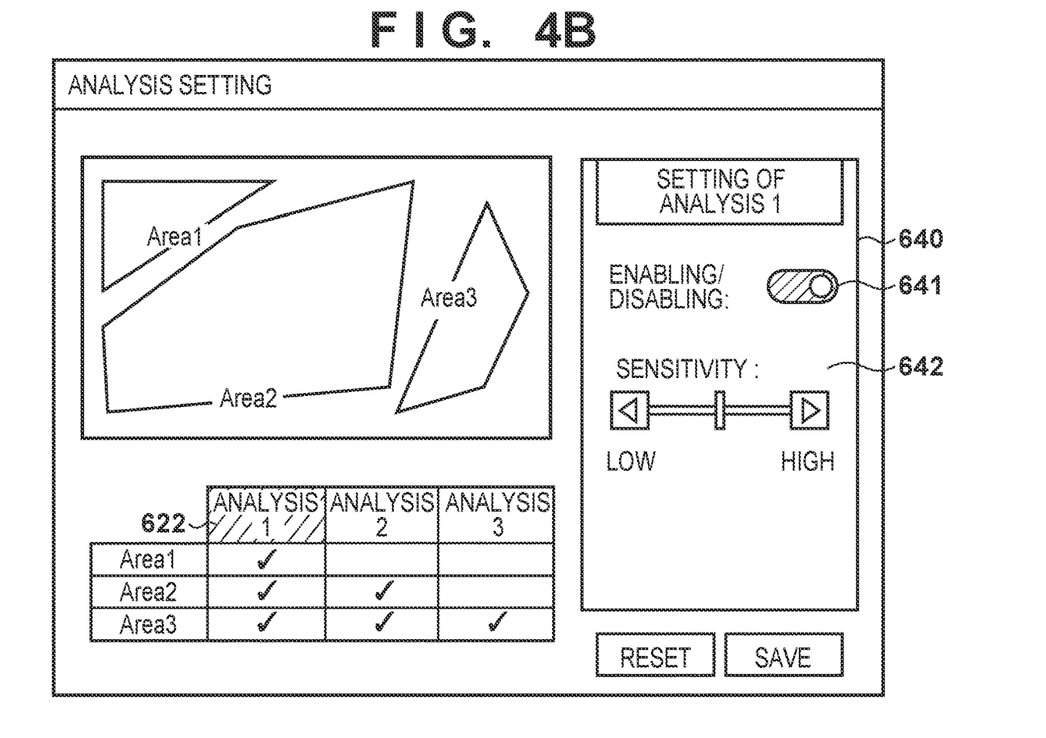

In addition, the user can select a desired one of columns in the selection portion 620 by operating the operation apparatus 150. In FIG. 4B, a button 622 (a button that displays analysis 1) corresponding to the first column is selected. At this time, as shown in FIG. 4B, a setting portion 640 used to set detailed settings of analysis 1 is displayed on the right side in the GUI 600.

A switching button 641 is a button for switching enabling/disabling, for which "enabling" is usually set. If the user sets "disabling" by operating the switching button 641 using the operation apparatus 150, execution of analysis 1 can be prohibited. On the other hand, if "enabling" is set, execution of analysis 1 can be permitted.

A sensitivity setting portion 642 is a setting portion unique to analysis 1, and includes, for example, a slider used to perform an operation of adjusting the sensitivity at which a person is detected. As described above, items set for each analysis may be different.

As described above, according to this embodiment, since the label of each polygonal region set on the screen is displayed at the middle point position of the longest side of the polygonal region, it is possible to improve the visibility of the polygonal region and its label, thereby improving, for example, the operability of various settings for the polygonal region.

Note that an analysis for counting, for each of the polygonal regions in the image sequentially sent from the image capturing apparatus 200 or the storage apparatus 400, the number of people included in the polygonal region may be executed as analysis 1. In this case, the CPU 101 may generate a file exemplified in FIG. 5.

Figure 5:
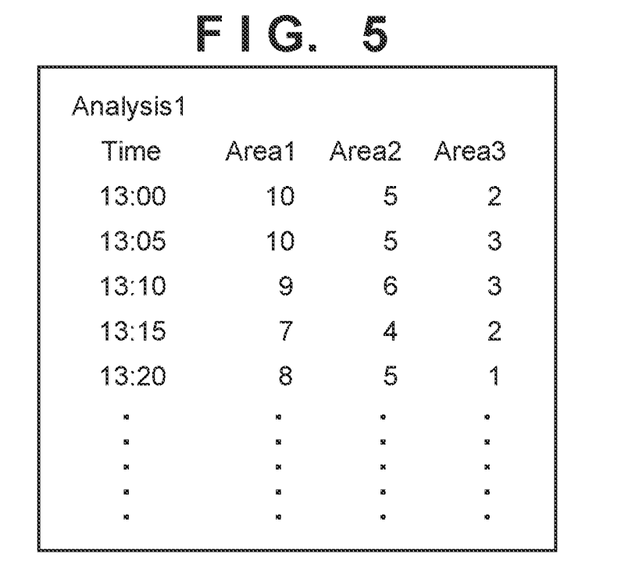
FIG. 5 is a view showing an example of the configuration of a file.

In the example shown in FIG. 5, for each of the polygonal regions with the labels "Area 1", "Area 2", and "Area 3", settings are made to execute analysis 1. In the example shown in FIG. 5, at the time of "13:00", 10 people are counted from the polygonal region with the label "Area 1", five people are counted from the polygonal region with the label "Area 2", and two people are counted from the polygonal region with the label "Area 3".

The file shown in FIG. 5 is output in, for example, a CSV file format. This definition of the label (character string) for identifying the polygonal region as an analysis target can improve the convenience of an analysis result output in a CSV file or the like.

As described above, according to this embodiment, since the label of each polygonal region set on the screen is displayed at the middle point position of the longest side of the polygonal region, it is possible to improve, for example, the usability of an output analysis result.

Note that in this embodiment, the middle point position on the longest side is set as the display position of the label. However, the present invention is not limited to this and, for example, a position, on the longest side, shifted from the middle point position may be set as the display position of the label.

Furthermore, in this embodiment, the label of each polygonal region is used as an example of information concerning the polygonal region. However, a display target is not limited to the label and any information concerning the polygonal region may be possible. For example, instead of or in addition to the label, the image coordinates or size of the polygonal region or an image attribute (an environment included in the polygonal region, such as an indoor, an outdoor, the center of a station, the end of a station, or a staircase) in the polygonal region may be displayed as "information concerning the polygonal region". Alternatively, instead of or in addition to the label, a result (the number of people in each polygonal region or the like) of a video analysis executed in each polygonal region may be displayed as "information concerning the polygonal region". In this case, the position obtained as the arrangement position of the label is set as the arrangement position of the "information concerning the polygonal region". Note that depending on the contents and amount of the "information concerning the polygonal region", a position obtained by appropriately offsetting the position obtained as the arrangement position of the label may be set as the arrangement position of the "information concerning the polygonal region".

Second Embodiment

In the following embodiments including this embodiment, differences from the first embodiment will be described, and the remaining is assumed to be the same as in the first embodiment unless it is specifically stated otherwise. In this embodiment, if a plurality of longest sides exist (are included) in a polygonal region and thus there are a plurality of candidates of the arrangement position of a label, one of the plurality of candidates is selected and decided as the arrangement position of the label of the polygonal region.

Figure 6:
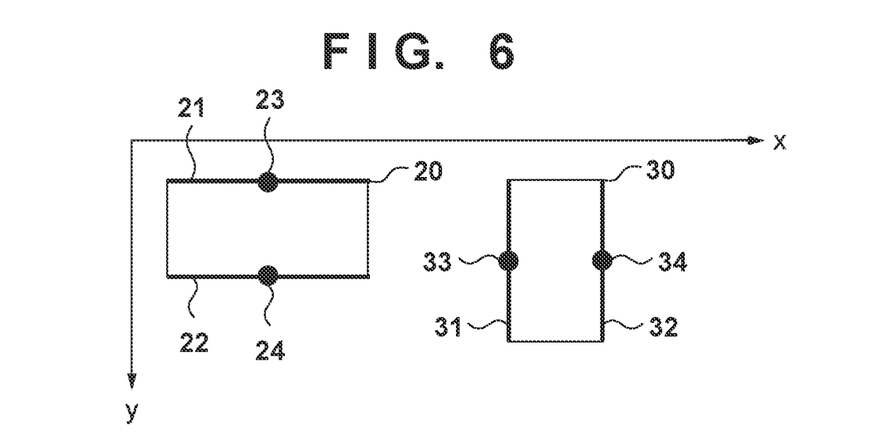
FIG. 6 is a view showing examples of a polygonal region having a plurality of longest sides.

FIG. 6 shows an example of a polygonal region in which a plurality of longest sides exist. In FIG. 6, the abscissa represents the x-axis and the ordinate represents the y-axis. Since a polygonal region 20 is a rectangle, and two sides 21 and 22 exist as longest sides, a middle point 23 of the side 21 and a middle point 24 of the side 22 are candidates of the arrangement position of the label of the polygonal region 20. Since a polygonal region 30 is also a rectangle, and two sides 31 and 32 exist as longest sides, a middle point 33 of the side 31 and a middle point 34 of the side 32 are candidates of the arrangement position of the label of the polygonal region 30.

In this embodiment, one of the middle point 23 of the side 21 and the middle point 24 of the side 22 is selected in accordance with a predetermined criterion, and set as the arrangement position of the label of the polygonal region 20. Similarly, one of the middle point 33 of the side 31 and the middle point 34 of the side 32 is selected in accordance with the predetermined criterion, and set as the arrangement position of the label of the polygonal region 30.

Figure 7A:
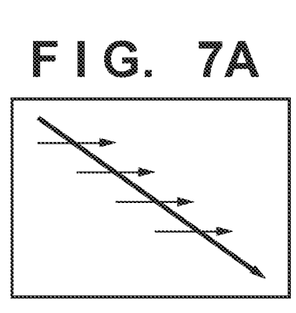
FIGS. 7A to 7C are views for explaining a selection criterion at the time of selection as the arrangement position of the label.
Figure 7B:
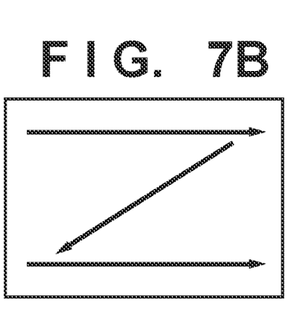
Figure 7C:
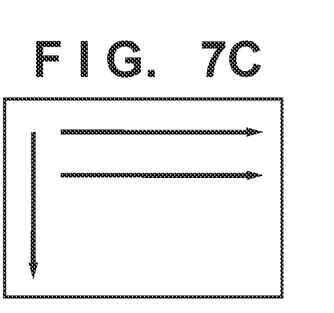

The selection criterion for selecting, when a plurality of candidates of the arrangement position of the label exist, one of the plurality of candidates as the arrangement position of the label will be described with reference to FIGS. 7A to 7C. FIGS. 7A to 7C are views for explaining the tendency of the movement of the line of sight of an ordinary person. FIG. 7A shows a known Gutenberg diagram indicating the tendency that a person moves the line of sight from the upper left to the lower right of a screen or paper surface. Similarly, the tendency of the movement of the line of sight is shown as the Z-pattern in FIG. 7B and shown as the F-pattern in FIG. 7C. As is apparent from FIGS. 7A to 7C, since there is a tendency that the line of sight is directed to the upper left first, if a plurality of candidates of the arrangement position of the label exist, in this embodiment, "preferentially selecting a candidate closest to the upper left of the screen" is set as the selection criterion. In accordance with the selection criterion, in the case shown in FIG. 6, with respect to the polygonal region 20, the middle point 23 out of the middle point 23 of the side 21 and the middle point 24 of the side 22 is selected (set) as the arrangement position of the label of the polygonal region 20. Furthermore, in the case shown in FIG. 6, with respect to the polygonal region 30, the middle point 33 out of the middle point 33 of the side 31 and the middle point 34 of the side 32 is selected (set) as the arrangement position of the label of the polygonal region 30.

Figure 8:
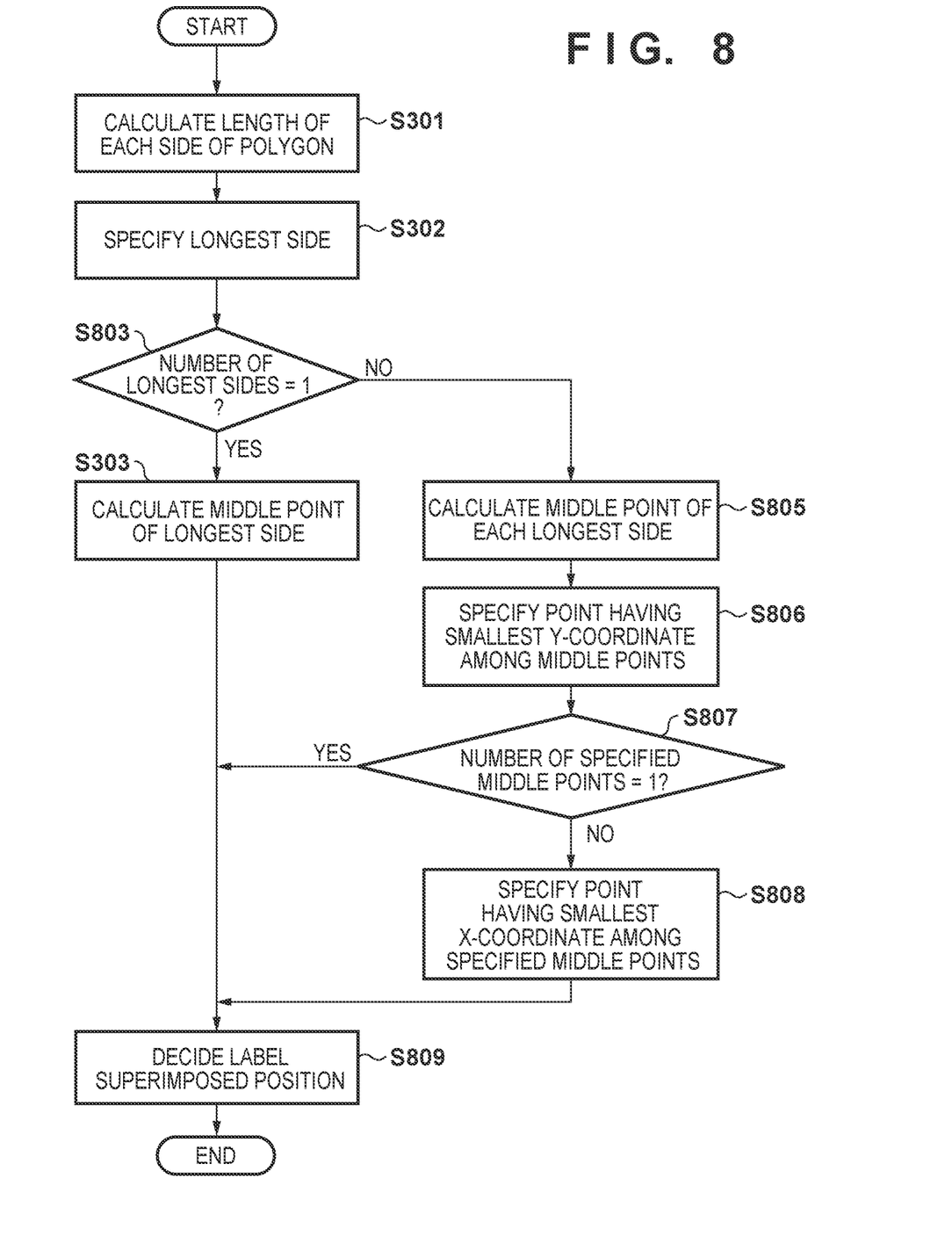
FIG. 8 is a flowchart illustrating processing of setting the arrangement position of the label of each polygonal region.

Processing of setting the arrangement position of the label of each polygonal region will be described with reference to a flowchart shown in FIG. 8. In FIG. 8, the same step numbers as those in FIG. 3 denote the same processing steps and a description thereof will be omitted.

In step S803, the CPU 101 determines whether the number of longest sides specified in step S302 is one. If, as a result of the determination processing, the number of longest sides specified in step S302 is one, the process advances to step S303; otherwise, the process advances to step S805.

In step S805, the CPU 101 specifies the position of the middle point of each longest side specified in step S302. In step S806, the CPU 101 specifies the position of the middle point having the smallest y-coordinate value among the positions of the middle points obtained in step S805.

In step S807, the CPU 101 determines whether the number of positions of the middle points specified in step S806 (the number of positions of the middle points each having the smallest y-coordinate value among the positions of the middle points obtained in step S805) is one. If, as a result of the determination processing, the number of positions is one, the process advances to step S809; otherwise, the process advances to step S808.

In step S808, the CPU 101 specifies the position of the middle point having the smallest x-coordinate value among the positions of the middle points specified in step S806 (the positions of the middle points each having the smallest y-coordinate value among the positions of the middle points obtained in step S805).

In step S809, the CPU 101 sets, as the arrangement position of the label of the polygonal region, the position of the middle point obtained in one of steps S303, S806, and S808, and stores the arrangement position in the RAM 103 or the external storage device 109.

After the processes in steps S301 to S809 are performed for each polygonal region set on the screen, the CPU 101 may cause the display device 130 to display the screen with the image displayed, on which the frame of each polygonal region and its label are superimposed. The label of each polygonal region is arranged at the arrangement position set for the polygonal region in the processing according to the flowchart of FIG. 8.

Note that a method of deciding the arrangement position of the label when a plurality of longest sides exist is not limited to the above-described one. For example, every time the user designates a vertex position on an image, "a line segment connecting the vertex position designated this time and a vertex position designated immediately before is set as a side of the polygonal region, and only if the side set this time is longer than a side set before, the middle point position of the side set this time is set as the arrangement position of the label". That is, only if a side set later is compared with each side set before and is then longest, the arrangement position of the label is repeatedly changed to the middle point position of the side set later, thereby deciding the final arrangement position of the label.

Third Embodiment

In this embodiment, if a plurality of polygonal regions each having a plurality of longest sides are set on a screen, the arrangement positions of the labels of the polygonal regions are separated. Processing of setting the arrangement positions of the labels of the polygonal regions will be described with reference to a flowchart shown in FIG. 9.

Figure 9:
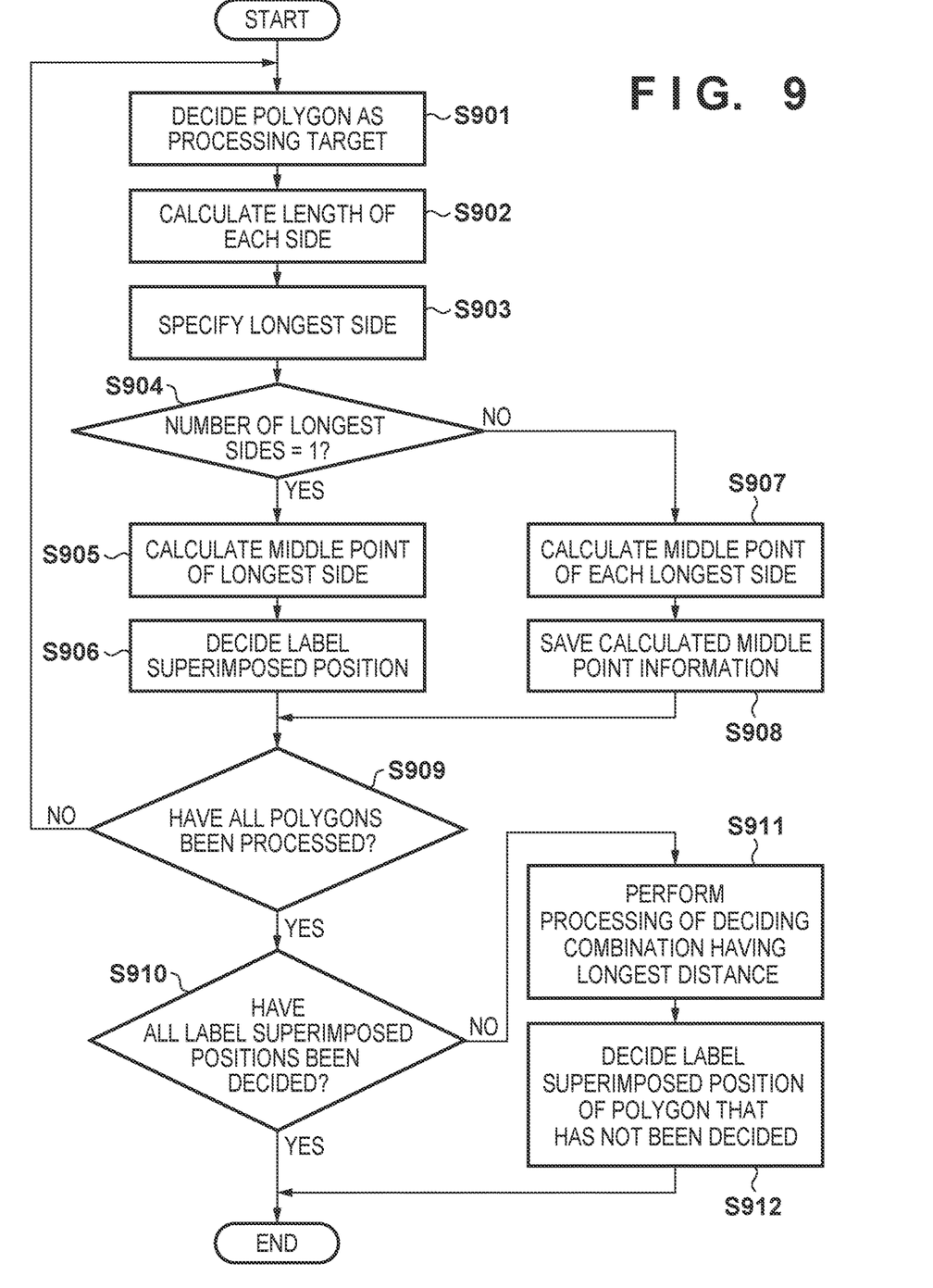
FIG. 9 is a flowchart illustrating processing of setting the arrangement position of the label of each polygonal region.

In step S901, a CPU 101 selects, as a selected polygonal region (a polygonal region as a processing target in steps S901 to S909), one of unselected polygonal regions among the polygonal regions set on the screen.

In step S902, the CPU 101 obtains the length of each side of the selected polygonal region, similarly to step S301 described above. In step S903, the CPU 101 specifies the longest side among the sides forming the selected polygonal region, similarly to step S302 described above.

In step S904, the CPU 101 determines whether the number of longest sides specified in step S903 is one. If, as a result of the determination processing, the number of longest sides specified in step S903 is one, the process advances to step S905; otherwise, the process advances to step S907.

In step S905, the CPU 101 specifies the position of the middle point of the longest side specified in step S903. In step S906, the CPU 101 sets, as the arrangement position of the label of the selected polygonal region, the middle point position obtained in step S905. In an example shown in FIG. 10A, since the longest side of a polygonal region C is an upper side, a position c of the middle point of the upper side is set as the arrangement position of the label of the polygonal region C.

On the other hand, in step S907, the CPU 101 specifies the position of the middle point of each of the longest sides specified in step S903. In step S908, the CPU 101 stores the middle point position obtained for each longest side in step S907 in a RAM 103 or an external storage device 109. In the example shown in FIG. 10A, since a polygonal region A is a square and thus four longest sides exist, positions a1, a2, a3, and a4 of the middle points of the sides are stored in the RAM 103 or the external storage device 109. In addition, in the example shown in FIG. 10A, since a polygonal region B is a rectangle and thus two longest sides exist, positions b1 and b2 of the middle points of the sides are stored in the RAM 103 or the external storage device 109.

In step S909, the CPU 101 determines whether all the polygonal regions on the screen have been selected as the selected polygonal regions. If, as a result of the determination processing, all the polygonal regions on the screen have been selected as the selected polygonal regions, the process advances to step S910. On the other hand, if among the polygonal regions on the screen, a polygonal region which has not been selected as the selected polygonal region remains, the process returns to step S901.

In step S910, the CPU 101 determines whether the arrangement position of the label has been set for all the polygonal regions on the screen. With respect to the polygonal region having one longest side, the middle point position on the longest side is set as the arrangement position of the label in step S906 described above. However, with respect to the polygonal region having two or more longest sides, the middle position on each longest side is stored in the RAM 103 or the external storage device 109 in step S908, and the arrangement position of the label has not been set.

If, as a result of the determination processing, the arrangement position of the label has been set for all the polygonal regions on the screen, the processing according to the flowchart shown in FIG. 9 is complete. On the other hand, if among the polygonal regions on the screen, a polygonal region for which the arrangement position of the label has not been set exists, the process advances to step S911.

That is, if one or more "polygonal regions each having two or more longest sides" are set on the screen, the process advances to step S911. On the other hand, if all the polygonal regions on the screen are "polygonal regions each having one longest side", the processing according to the flowchart shown in FIG. 9 is complete.

In step S911, the CPU 101 decides a combination of the arrangement positions of the labels of the polygonal regions so that the arrangement positions of the labels of the polygonal regions on the screen are separated as much as possible.

Figure 10A:
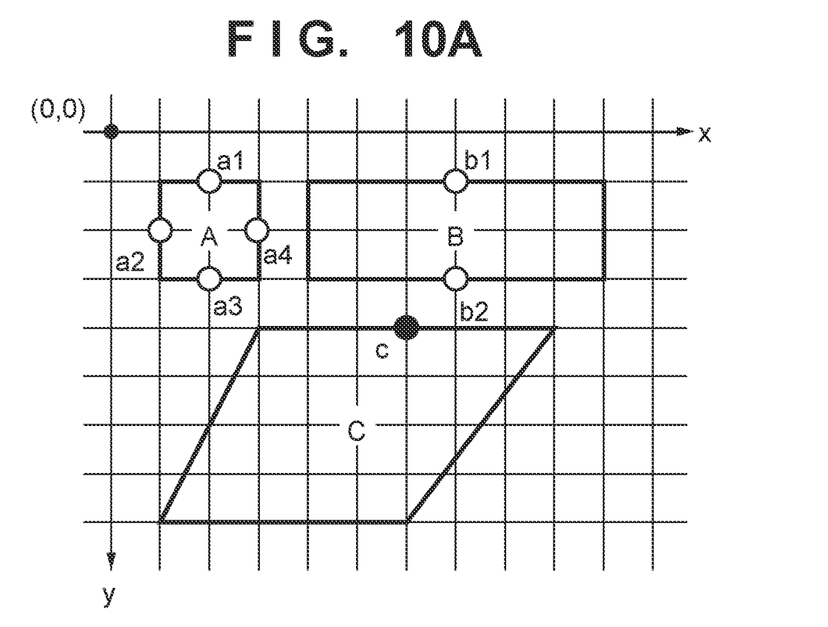
FIGS. 10A and 10B are views showing a practical example of the third embodiment.

In the case shown in FIG. 10A, with respect to the polygonal region A, the arrangement position of the label has not been decided, and the positions a1, a2, a3, and a4 have been stored in the RAM 103 and the external storage device 109. With respect to the polygonal region B, the arrangement position of the label has not been decided, and the positions b1 and b2 have been stored in the RAM 103 and the external storage device 109. With respect to the polygonal region C, the position c has been decided as the arrangement position of the label, and thus the position c is confirmed as the arrangement position of the label of the polygonal region C. Therefore, one of the positions a1, a2, a3, and a4 is decided as the arrangement position of the label of the polygonal region A and one of the positions b1 and b2 is decided as the arrangement position of the label of the polygonal region B so that the distances among the arrangement position of the label of the polygonal region A, the arrangement position of the label of the polygonal region B, and the arrangement position c of the label of the polygonal region C are longest.

The following table shows examples of the coordinates of the positions a1, a2, a3, and a4 stored with respect to the polygonal region A, the coordinates of the positions b1 and b2 stored with respect to the polygonal region B, and the coordinates of the position c confirmed with respect to the polygonal region C.

TABLE 1

| Coordinates of Middle Point of Longest Side of Each Polygon | | | |
|---|---|---|---|
| Region (Polygon) | A | B | C |
| Decided Label Superimposed Position | — | — | (6, 4) |
| Coordinates 1 of Middle Point of Longest Side | (2, 1) | (7, 1) | — |
| Coordinates 2 of Middle Point of Longest Side | (1, 2) | (7, 3) | — |
| Coordinates 3 of Middle Point of Longest Side | (2, 3) | — | — |
| Coordinates 4 of Middle Point of Longest Side | (3, 2) | — | — |

In this embodiment, for each combination of one of the positions a1, a2, a3, and a4, one of the positions b1 and b2, and the position c, the total distance of the distances between the positions is obtained, and then the combination for which the longest total distance is obtained is specified.

Assume that the coordinates of the positions a1, a2, a3, and a4 stored with respect to the polygonal region A, the coordinates of the positions b1 and b2 stored with respect to the polygonal region B, and the coordinates of the position c confirmed with respect to the polygonal region C are indicated by the above table. In this case, the total distance for the combination of the positions a1, b1, and c is obtained by:

$$d(a1, b1) + d(b1, c) + d(c, a1) = \sqrt{(2-7)^2 + (1-1)^2} + \sqrt{(7-6)^2 + (1-4)^2} + \sqrt{(6-2)^2 + (4-1)^2} \approx 13.2 \quad (1)$$

wherein d(a1, b1) represents the distance between the positions a1 and b1. The following table shows a result of obtaining the total distances for all the combinations in this way.

TABLE 2

| Total of Distances Between Points | |
|---|---|
| Combination of Points | Total Distance |
| a1, b1, c | 13.2 |
| a1, b2, c | 11.8 |
| a2, b1, c | 14.6 |
| a2, b2, c | 12.9 |
| a3, b1, c | 10.9 |
| a3, b2, c | 9.1 |
| a4, b1, c | 12.7 |
| a4, b2, c | 10.5 |

Figure 10B:
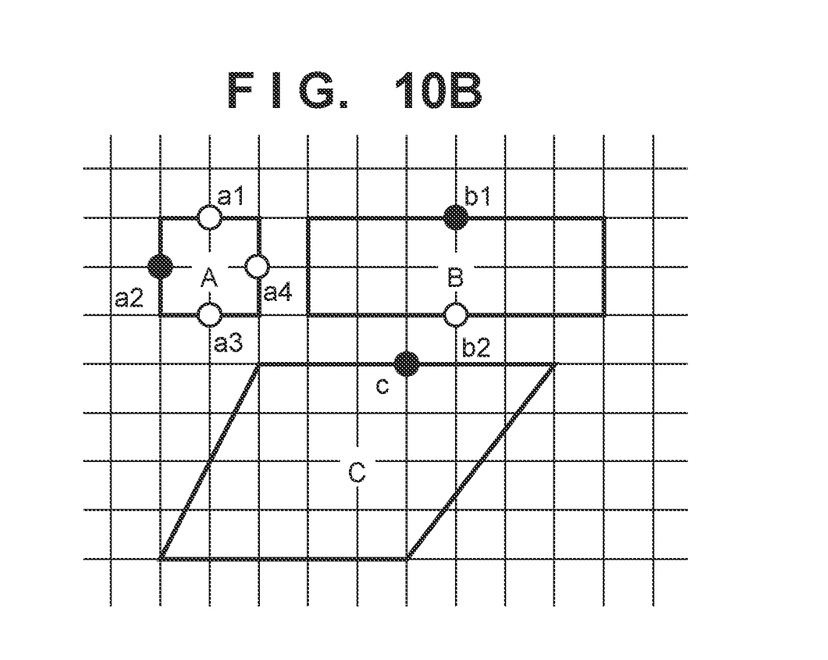

In accordance with this table, since the combination of the positions for which the longest total distance is obtained is (a2, b1, c), the positions (a2, b1, c) represented by solid circles in FIG. 10B are confirmed as the arrangement positions of the labels.

As described above, even if a plurality of polygonal regions each having a plurality of longest sides are set on the screen, the positions of the labels of the polygonal regions are set to be separated, and it is thus possible to avoid inconvenience that, for example, it is difficult to read the plurality of labels because the positions of the labels are too close.

Fourth Embodiment

In this embodiment, after confirming the arrangement position of the label of each polygonal region in each of the first to third embodiments, the arrangement position of the label is modified because, for example, the distance is equal to or shorter than a predetermined one.

Figure 11:
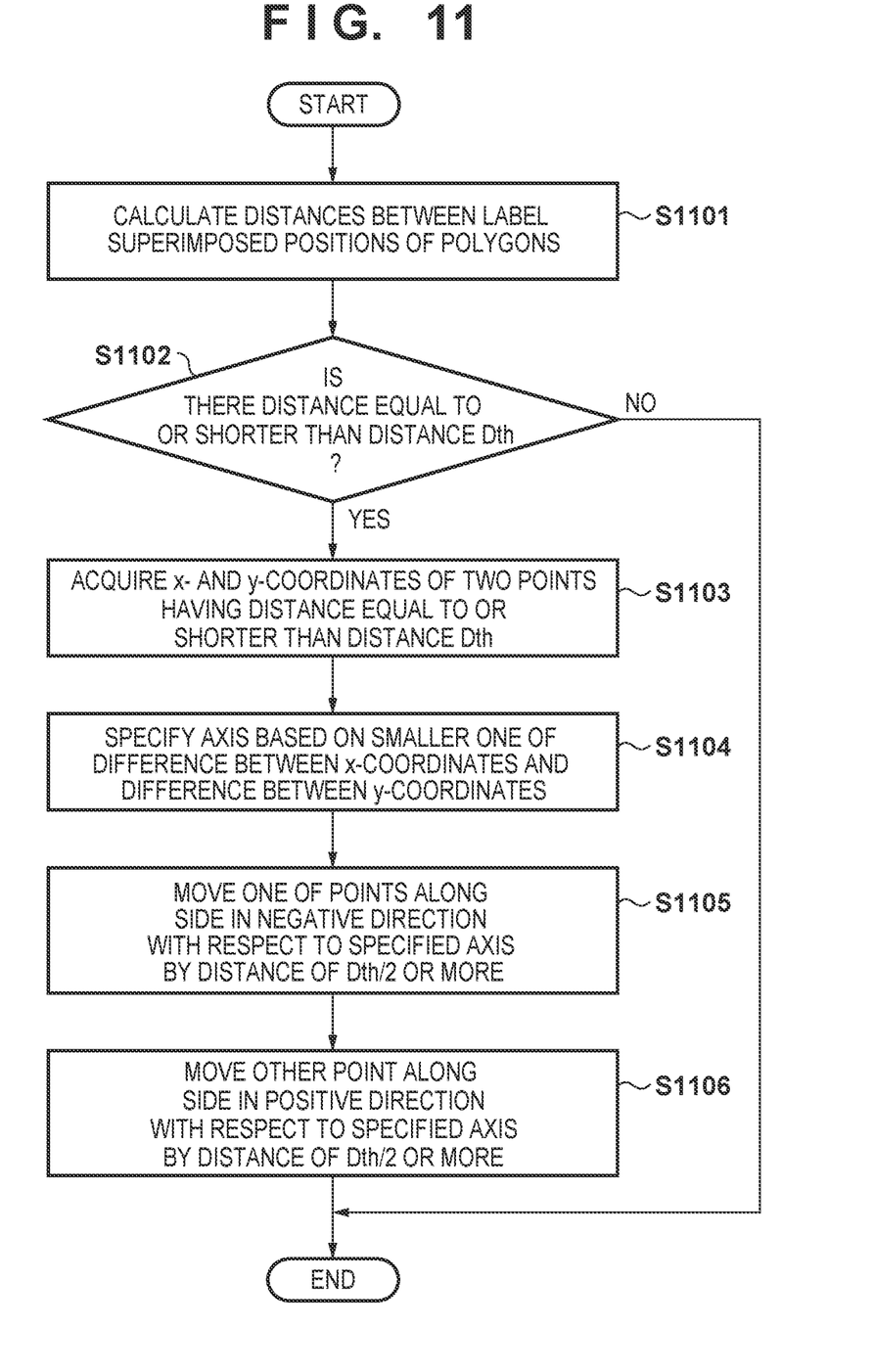
FIG. 11 is a flowchart according to the fourth embodiment.

Processing according to a flowchart shown in FIG. 11 is processing executed after confirming the arrangement position of the label of each polygonal region in each of the first to third embodiments (that is, after the processing according to the flowchart shown in FIG. 3, 8, or 9). Note that the processing according to the flowchart shown in FIG. 11 is executed only if the number of polygonal regions set on a screen is two or more, and is not executed if the number of polygonal regions set on the screen is one.

In step S1101, a CPU 101 obtains the distance between labels (the distance between the arrangement positions of the labels) for all pairs of labels. In step S1102, the CPU 101 determines whether, among the distances obtained in step S1101, a distance equal to or shorter than a distance Dth (threshold) as a preset threshold exists. If, as a result of the determination processing, among the distances obtained in step S1101, a distance equal to or shorter than the distance Dth exists, the process advances to step S1103; otherwise, the processing according to the flowchart shown in FIG. 11 is complete.

In step S1103, the CPU 101 sets, as a target pair, the pair of labels for which the distance equal to or shorter than the distance Dth has been obtained, and acquires an arrangement position (x1, y1) of one of the labels included in the target pair and an arrangement position (x2, y2) of the other label.

In step S1104, the CPU 101 specifies a smaller one of a difference $\Delta x$ ($=|x1-x2|$) between the x-coordinate value of one of the labels and that of the other label and a difference $\Delta y$ ($=|y1-y2|$) between the y-coordinate value of one of the labels and that of the other label. If $\Delta x < \Delta y$, the CPU 101 specifies the x-axis as the reference axis of a direction in which the arrangement position of the label is corrected. If $\Delta x > \Delta y$, the CPU 101 specifies the y-axis as the reference axis.

In step S1105, the CPU 101 moves the arrangement position of one of the labels included in the target pair along a side corresponding to this label in one direction (for example, the negative direction) of the reference axis. At this time, a moving distance is decided to be at least Dth/2.

In step S1106, the CPU 101 moves the arrangement position of the other label included in the target pair along a side corresponding to this label in the other direction (for example, the positive direction) of the reference axis. At this time as well, a moving distance is decided to be at least Dth/2.

Figure 12A:
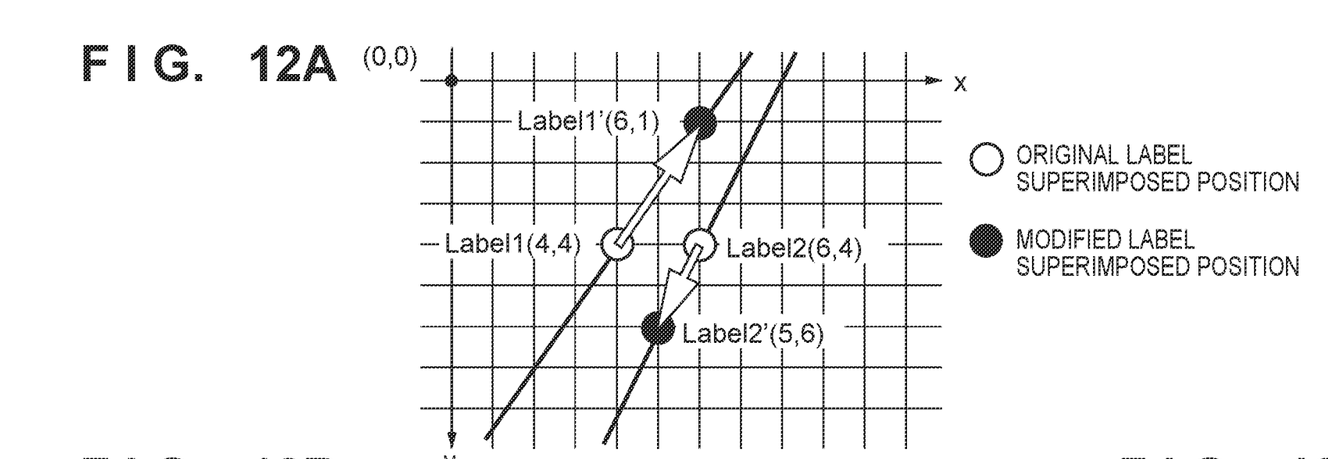
FIGS. 12A to 12C are views for visually explaining processing according to the flowchart shown in FIG. 11.
Figure 12B:
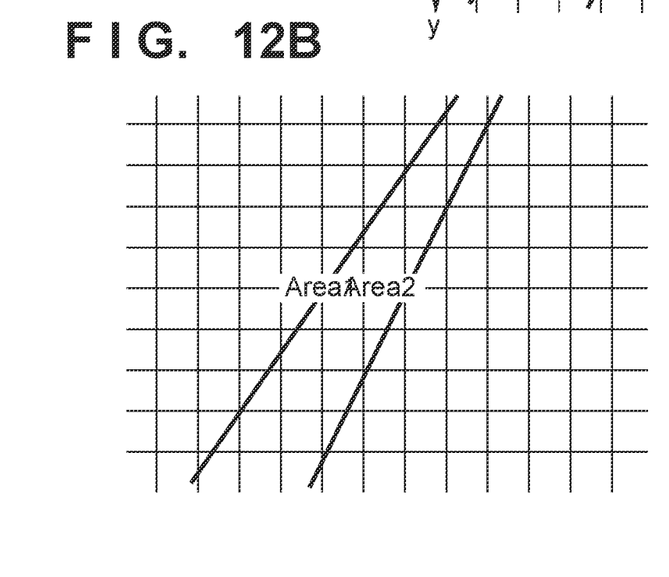
Figure 12C:
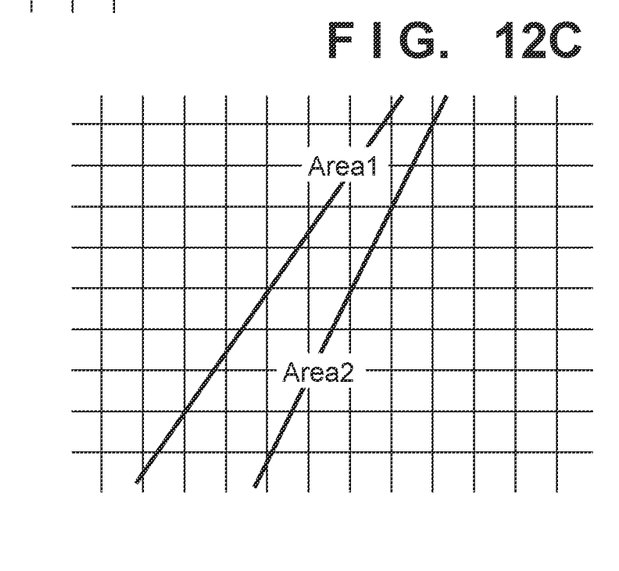

Such correction of the arrangement position of the label corrects the arrangement positions of the two labels for which the distance equal to or smaller than the distance threshold Dth has been obtained, thereby preventing the visibility of the labels from degrading. FIGS. 12A to 12C are views for visually explaining the processing according to the flowchart shown in FIG. 11. In FIG. 12A, two open circles represent the arrangement positions of the two labels included in the target pair. If labels (character strings) "Area 1" and "Area 2" are superimposed at the arrangement positions, the characters overlap each other, as shown in FIG. 12B, and it is difficult to read the labels. Assume that the distance threshold Dth when performing correction to prevent such positional relationship is defined as 3.

Referring to FIG. 12A, the distance between an arrangement position Label 1 of one (left open circle) of the labels included in the target pair and an arrangement position Label 2 of the other label (right open circle) is 2 (step S1101). Since this distance is equal to or smaller than Dth (YES in step S1102), processing of correcting the arrangement positions of the labels is performed (steps S1103 to S1106).

(4, 4) and (6, 4) are acquired as the arrangement positions Label 1 and Label 2, respectively (step S1103). Since the x-coordinate difference $\Delta x=2$ and the y-coordinate difference $\Delta y=0$ are obtained for the arrangement positions Label 1 and Label 2, and $\Delta x > \Delta y$ is satisfied, the y-axis is specified as the reference axis (step S1104).

Therefore, an arrangement position Label 1' obtained by moving the arrangement position Label 1 along the side corresponding to a corresponding one of the labels in the negative direction of the y-axis by Dth/2 (=1.5) or more is set as the corrected arrangement position of the corresponding label (step S1105).

Similarly, an arrangement position Label 2' obtained by moving the arrangement position Label 2 along the side corresponding to the other label in the positive direction of the y-axis by Dth/2 (=1.5) or more is set as the corrected arrangement position of the other label (step S1106).

FIG. 12C shows a result of arranging one label at the arrangement position Label 1' and arranging the other label at the arrangement position Label 2'. As shown in FIG. 12C, the labels that overlap each other in FIG. 12B since the arrangement positions are close to each other are separated. Thus, overlapping of the labels is eliminated, and it is possible to read the labels.

Note that this embodiment has explained the distance Dth as a fixed value. However, the distance Dth may be adjustable in accordance with the size of each label and the number of characters of each label. Furthermore, an arrangement that copes with superimposing of labels with different vertical and horizontal sizes by allowing different thresholds to be set in the x-axis direction and the y-axis direction is also possible.

In addition, in this embodiment, correction is performed so as to move the arrangement positions of the labels included in the target pair so that the distance between the labels becomes longer (so as to move the arrangement positions in opposite directions). However, a method of correcting arrangement positions is not limited to the above one. Assume, for example, that the length of the longest side corresponding to one of the labels included in the target pair is sufficiently longer than the longest side corresponding to the other label. In this case, only the arrangement position of the one label may be moved by the distance Dth or more, and the arrangement position of the other label may be prevented from being moved. Note that "the length of the longest side corresponding to one of the labels included in the target pair is sufficiently longer than the longest side corresponding to the other label" indicates that, for example, a ratio of the length of the longest side corresponding to one of the labels to the length of the longest side corresponding to the other label is equal to or higher than a threshold. Alternatively, "the length of the longest side corresponding to one of the labels included in the target pair is sufficiently longer than the longest side corresponding to the other label" may indicate that the absolute value of the difference between the lengths of the longest sides is equal to or larger than a threshold. This is effective as a measure taken to reduce the possibility that when moving the arrangement position of the label on a shorter side, the arrangement position deviates from the side and thus the correspondence between the side and the label becomes unclear.

An arrangement may be employed, in which the arrangement position of a label near the end portion of the screen is finely adjusted in the horizontal and vertical directions to fall within the screen in consideration of the size of the label and then the above position correction processing that ensures the distance between the arrangement positions of the labels is executed.

In addition, correction of the arrangement position of a label, that copes with a case in which, for example, the label is a horizontally written character string and is desirably displayed along a superimposing target side as much as possible, may be performed. In this case, if the horizontal size of the label is equal to or larger than a predetermined size when the longest side is almost vertical (for example, in a direction of 60° to 120° with respect to the horizontal direction), the arrangement position may be moved to another side that is almost horizontal (up to ±30° with respect to the horizontal direction) and has a length equal to or longer than a predetermined length. As described above, according to this embodiment, it is possible to superimpose and display a label with higher visibility.

Furthermore, the arrangement and use method of the GUI described in the above embodiments are merely examples. As long as it is possible to obtain the same effect, the arrangement and use method of the GUI are not specifically limited. The method of obtaining an index such as the distance described in the above embodiments is merely an example, and is not specifically limited. In addition, the numerical values used in the above embodiments are exemplarily used to provide a detailed description, and the present invention is not intended to limit the numerical values used in the above embodiments.

In the above embodiments, when the image processing apparatus 100 executes processing using a computer program and data, the above processing is achieved. However, the similar processing may be implemented by hardware for image processing.

Furthermore, some or all of the above-described embodiments may appropriately be combined and used. Some or all of the above-described embodiments may selectively be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-196885, filed Oct. 18, 2018, which is hereby incorporated by reference herein in its entirety.

What is claimed is:

1. An image processing apparatus comprising:
    a processor; and
    a memory for storing instructions to be executed by the processor, wherein, when the instructions stored in the memory are executed by the processor, the image processing apparatus functions as a plurality of units comprising:
    (1) a setting unit configured to set, according to a user operation, a plurality of polygonal regions on an image captured by an image capturing unit;
    (2) a specifying unit configured to specify, for each of the plurality of polygonal regions, a longest side among sides of the polygonal region;
    (3) a display control unit configured to cause a display unit to display the image on which the plurality of polygonal regions and pieces of information concerning the polygonal regions are superimposed; and
    (4) a determination unit configured to determine, for each pair of the pieces of information of the polygonal regions, whether a distance between display positions of the pieces of information in the pair to be displayed is shorter than a threshold,
    wherein the display control unit causes the display unit to display, for each of the plurality of polygonal regions, a respective one of the pieces of information at a position of a middle point of the longest side of the polygonal region, and
    wherein, in a case where the distance between display positions of the pieces of information in a first pair is shorter than the threshold, the display control unit causes the display unit to display a respective one of the pieces of information in the first pair so that the pieces of information in the first pair do not overlap each other.

2. The apparatus according to claim 1, wherein the setting unit sets details of the analysis process for the polygonal region set in the image.

3. The apparatus according to claim 1, wherein, if the polygonal region has a plurality of longest sides, the display control unit causes the display unit to display the piece of information at a position based on a side closest to an upper left corner of the image among the plurality of longest sides.

4. An image processing method comprising:
- setting, according to a user operation, a plurality of polygonal regions on an image captured by an image capturing unit;
- specifying, for each of the plurality of polygonal regions, a longest side among sides of the polygonal region;
- causing a display unit to display the image on which the plurality of polygonal regions and pieces of information concerning the polygonal regions are superimposed; and
- determining, for each pair of the pieces of information of the polygonal regions, whether a distance between display positions of the pieces of information in the pair to be displayed is shorter than a threshold,
- wherein in the causing the display unit to display the image on which the plurality of polygonal regions and pieces of information concerning the polygonal regions are superimposed, (a) for each of the plurality of polygonal regions, a respective one of the pieces of information is displayed at a position of a middle point of the longest side of the polygonal region, and (b) in a case where the distance between display positions of the pieces of information in a first pair is shorter than the threshold, the display unit is caused to display a respective one of the pieces of information in the first pair so that the pieces of information in the first pair do not overlap each other.

5. A non-transitory computer-readable storage medium storing a computer program for causing a computer to function as a plurality of units comprising:
- a setting unit configured to set, according to a user operation, a plurality of polygonal regions on an image captured by an image capturing unit;
- a specifying unit configured to specify, for each of the plurality of polygonal regions, a longest side among sides of the polygonal region;
- a display control unit configured to cause a display unit to display the image on which the plurality of polygonal regions and pieces of information concerning the polygonal regions are superimposed; and
- a determination unit configured to determine, for each pair of the pieces of information of the polygonal regions, whether a distance between display positions of the pieces of information in the pair to be displayed is shorter than a threshold,
- wherein the display control unit causes the display unit to display, for each of the plurality of polygonal regions, a respective one of the pieces of information at a position of a middle point of the longest side of the polygonal region, and
- wherein, in a case where the distance between display positions of the pieces of information in a first pair is shorter than the threshold, the display control unit causes the display unit to display a respective one of the pieces of information in the first pair so that the pieces of information in the first pair do not overlap each other.

* * * * *